R. J. LYMAN.
LIQUID MEASURING DEVICE.
APPLICATION FILED AUG. 1, 1919.
1,413,988.
Patented Apr. 25, 1922.
2 SHEETS—SHEET 1.
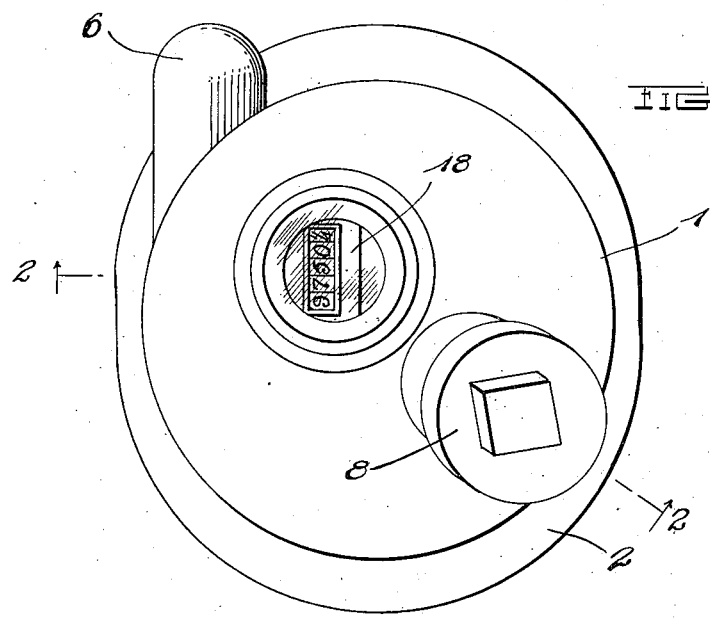
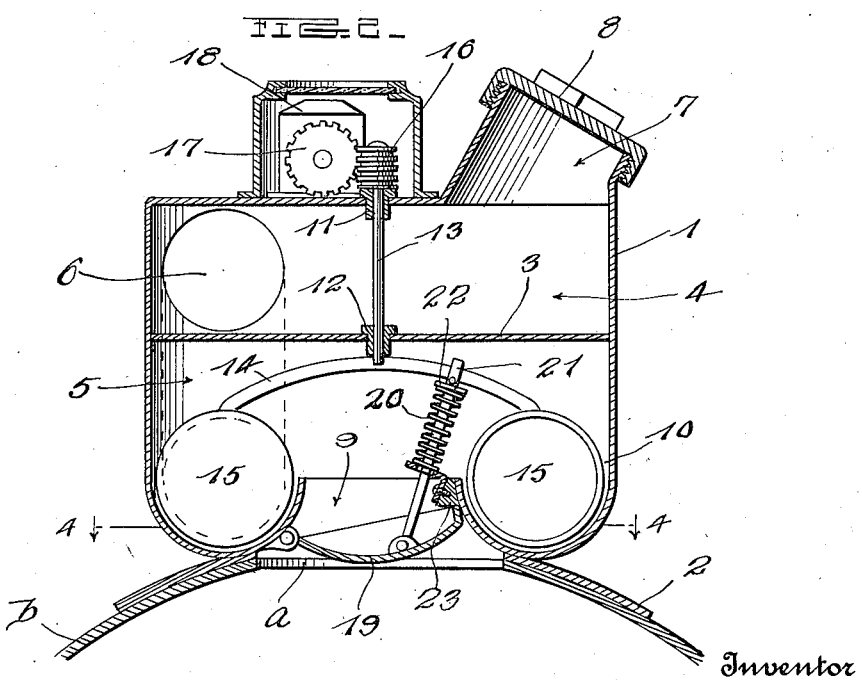
Witness
George W. Giovanytt
Inventor
R. J. Lyman
By H. B. Willson & Co
Attorneys

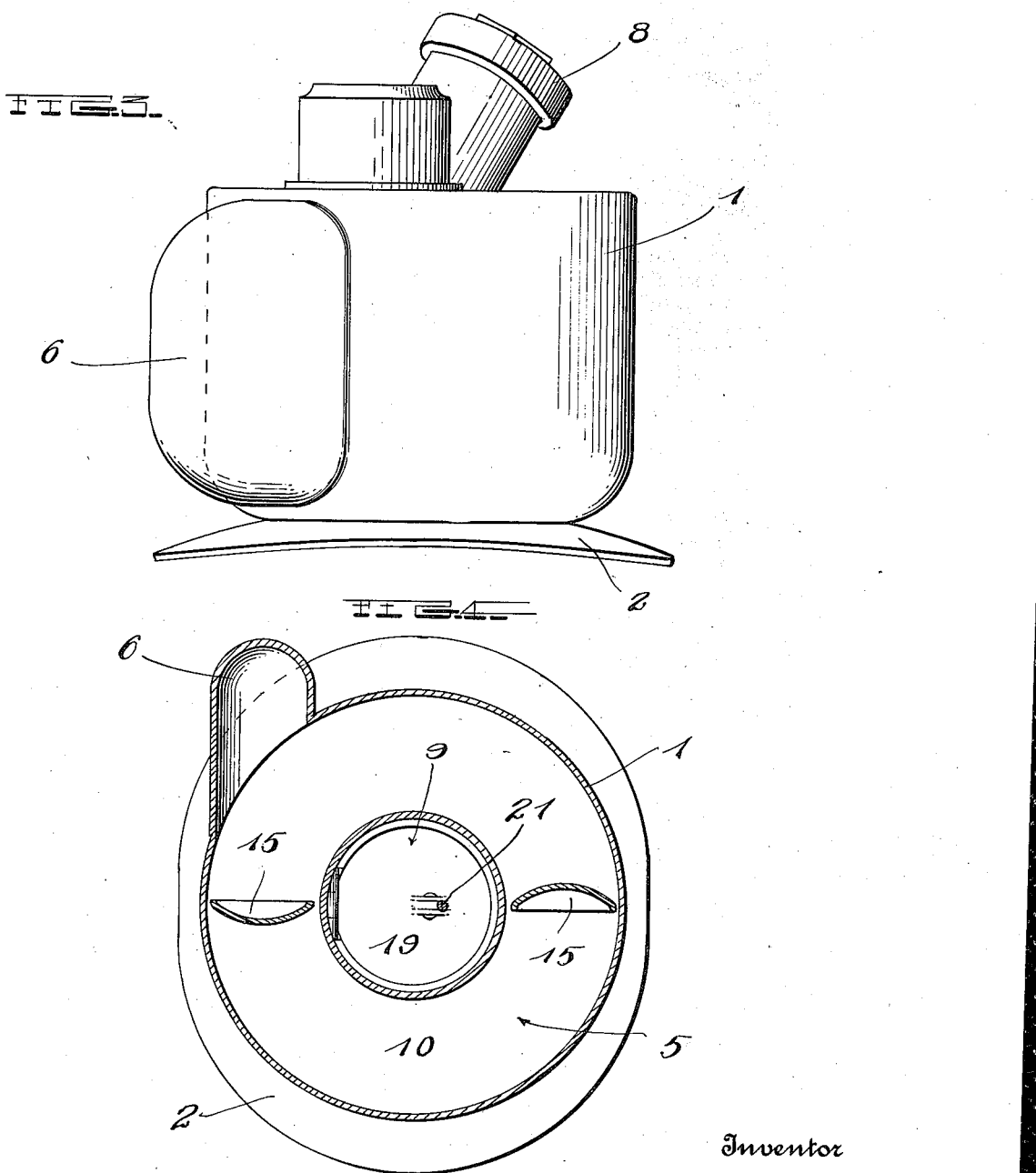

UNITED STATES PATENT OFFICE.

RAY JAY LYMAN, OF BERKELEY, CALIFORNIA, ASSIGNOR TO GREAT WESTERN METER COMPANY, OF SAN FRANCISCO, CALIFORNIA, A CORPORATION OF CALIFORNIA.

LIQUID-MEASURING DEVICE.

1,413,988.   Specification of Letters Patent.   Patented Apr. 25, 1922.

Application filed August 1, 1919. Serial No. 314,774.

*To all whom it may concern:*

Be it known that I, RAY J. LYMAN, a citizen of the United States, residing at Berkeley, in the county of Alameda and State of California, have invented certain new and useful Improvements in Liquid-Measuring Devices; and I do declare the following to be a full, clear, and exact description of the invention, such as will enable others skilled in the art to which it appertains to make and use the same.

This invention relates to certain new and useful improvements in liquid measuring devices.

One object of the invention is to provide means for automatically registering a quantity of liquid which is directed through the same, and is particularly applicable in connection with a meter for measuring the amount of gasoline introduced into the tank of an automobile.

Another object of the invention is to provide a registering device of this character in which the registering mechanism is automatically locked when no fluid is passing through the device.

A further object of the invention is to improve upon devices of this general nature by the provision of a comparatively simple, strong, durable and inexpensive construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings forming a part of the application and in which similar reference characters designate like parts throughout the several views:

Figure 1 is a top plan view of a device constructed in accordance with this invention;

Fig. 2 is a vertical sectional view taken on the line 2—2 of Fig. 1;

Fig. 3 is a side view of the device; and

Fig. 4 is a horizontal sectional view taken on the plane indicated by the line 4—4 of Fig. 2.

For the sake of illustrating a practical adaptation of the invention, the structure shown is a meter for measuring gasoline as it is being poured into an automobile tank and in this connection the numeral 1 designates a casing of cylindrical shape provided with a curved circular flange 2 at its lower side to facilitate in attaching the casing to the filling opening *a* of the automobile gasoline tank *b*. The casing 1 is provided with a horizontally disposed partition 3 dividing the same into an upper chamber 4 and a lower chamber 5. These two chambers communicate with each other by means of a curved by-pass 6, and the upper chamber 4 is provided with a filling opening or inlet 7 normally closed by a screw cap 8, while the lower chamber 5 is provided with a centrally disposed outlet 9. The lower chamber 5 is also provided with an annular channel 10, the latter surrounding the outlet 9 and overflowing into the same. The aforementioned bypass 6 enters the chamber 5 at a point adjacent the well 10, so that liquid enters the latter from a tangential direction.

Arranged in the upper side of the casing 1 and in the partition 3 and disposed in alinement centrally of the casing is a pair of bearings 11 and 12, and in these bearings is mounted a shaft 13, the latter being disposed vertically and having outwardly extending and downwardly inclining arms 14 at its lower ends. Carried at the lower ends of the arms 14 are blades or paddles 15 which dip into the channel 10 so that they will propel the shaft 13 when liquid is passing through said channel.

The upper end of the shaft 13 is provided with a worm 16 which meshes with a worm wheel 17, the latter being connected with a suitable indicator 18 in such a manner that when the shaft 13 revolves the indicator will be actuated. This indicator 18 is here shown arranged in a suitable cover and is disposed at the upper side of the casing 1.

The outlet 9 is provided with a downwardly opening self closing valve 19, this self closing feature being accomplished by a spring 20 surrounding the valve rod 21 and disposed between a stop 22 carried by the latter and a lug 23 projecting inwardly from the inner wall of the well 10. When the valve is closed the rod 21 extends up far enough to be disposed in the path of the arms 14 and thus serves to lock the turbine (the shaft 13, the arms 14 and the blades 15) against rotation to such an extent as to change the reading of the register.

In operation, when the cap 8 is removed and gasoline is poured into the inlet 7 it will first fill up the chamber or reservoir 4. From this it will pass through the by pass 6 into the chamber 5. Upon reaching the chamber 5 it will flow into and around the channel 10 striking the blades from a tangential direction and causing the turbine to rotate and operate the register 18. From the channel 10 the gasoline will overflow into the outlet 9 and its weight opens the valve 19 so that the rod 21 is moved out of the path of the arms 14. The motion of the turbine continues as long as gasoline is being poured into the inlet 7 and the valve 19 is held open by the gasoline passing through the same on its way to the tank.

From the foregoing description taken in connection with the accompanying drawings the construction, use and operation of the invention will be readily understood.

As various changes in form, proportion, and in the minor details of construction may be resorted to without departing from the spirit of this invention it is to be understood that I do not wish to be limited to the precise construction herein shown and described.

I claim:

1. A device of the class described comprising a casing having an annular channel in its lower end, an inlet leading into said channel, an outlet from the casing formed by the inner wall of said channel, a turbine mounted in said casing and having blades dipping into said channel to be rotated by the liquid flowing therethrough, and a register operatively connected with said turbine.

2. A device of the class described comprising a circular casing having a tangential inlet in its vertical wall and having a central outlet in its bottom surrounded by an annular channel, the rim of said outlet being above the bottom of the channel, a vertical shaft rotatably mounted in said casing in axial alignment with said outlet, arms depending from said shaft and having paddles operating in said channel, and a register operatively connected with said shaft.

3. A device of the class described comprising a casing having a horizontal partition dividing it into an upper chamber and a lower chamber, said upper chamber having an inlet while the lower chamber is provided with an outlet, a by pass around the partition establishing communication between said chambers and opening tangentially into the lower chamber, a turbine mounted in said lower chamber, and a register operatively connected with said turbine.

4. A device of the class described comprising a casing divided by a horizontal partition into an upper and a lower chamber, said upper chamber having an inlet while the lower portion of the lower chamber is provided with an outlet bordered by an upstanding flange providing an annular channel between itself and the casing wall, a by pass around said partition placing said upper and lower chambers in communication and opening tangentially into the lower chamber, a turbine rotatably mounted in said casing and having paddles operating in said annular channel, and a register operatively connected with said turbine.

5. A device of the class described comprising a casing having an inlet and an outlet, a turbine mounted in said casing, a register operatively connected with said turbine, and liquid-released means at said outlet for normally holding said turbine against operation, but for releasing said turbine for use when liquid is passing through the casing.

6. A device of the class described comprising a casing having an inlet and an outlet, a turbine mounted in said casing, a register operatively connected with said turbine, a self-closing outwardly-opening valve mounted in said outlet, and means carried by said valve for locking said turbine against operation only when said valve is closed.

In testimony whereof I have hereunto set my hand.

RAY JAY LYMAN.